United States Patent
Awada et al.

(10) Patent No.: US 11,395,206 B2
(45) Date of Patent: Jul. 19, 2022

(54) MEASUREMENT CONFIGURATION

(71) Applicant: Nokia Technologies Oy, Espoo (FI)

(72) Inventors: Ahmad Awada, Munich (DE); Mikko Säily, Laukkoski (FI); Jarmo Mäkinen, Espoo (FI)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/500,848

(22) PCT Filed: May 4, 2017

(86) PCT No.: PCT/FI2017/050345
§ 371 (c)(1),
(2) Date: Oct. 4, 2019

(87) PCT Pub. No.: WO2018/202936
PCT Pub. Date: Nov. 8, 2018

(65) Prior Publication Data
US 2020/0100161 A1    Mar. 26, 2020

(51) Int. Cl.
*H04W 4/00* (2018.01)
*H04W 36/30* (2009.01)
(Continued)

(52) U.S. Cl.
CPC ..... *H04W 36/305* (2018.08); *H04W 36/0094* (2013.01); *H04W 36/00835* (2018.08); *H04W 36/18* (2013.01)

(58) Field of Classification Search
CPC .............................. H04W 36/30; H04W 36/305
See application file for complete search history.

(56) References Cited

U.S. PATENT DOCUMENTS

| | | |
|---|---|---|
| 2011/0039552 A1 | 2/2011 | Narasimha et al. |
| 2011/0053595 A1 | 3/2011 | Snow et al. |
| | (Continued) | |

FOREIGN PATENT DOCUMENTS

| | | |
|---|---|---|
| EP | 2645802 A1 | 10/2013 |
| EP | 2869638 A1 | 5/2015 |
| | (Continued) | |

OTHER PUBLICATIONS

"Way Forward for Hetnet Re-establishment Enhancements", 3GPP TSG-RAN WGr2 meeting #84, R2-134097, Agenda: 7.1.3.2, NSN, Nov. 11-15, 2013, 5 pages.

(Continued)

*Primary Examiner* — Omoniyi Obayanju
(74) *Attorney, Agent, or Firm* — Brake Hughes Bellermann LLP

(57) ABSTRACT

According to an example aspect of the present invention, there is provided an apparatus (110) comprising at least one processing core, at least one memory including computer program code, the at least one memory and the computer program code being configured to, with the at least one processing core, cause the apparatus at least to receive, from a first cell (120), an indication of a measurement configuration valid for at least one neighbour cell (130) of the first cell (120), and perform at least one measurement in accordance with the measurement configuration responsive to a radio link failure of a radio link (112) over which the apparatus is communicating.

15 Claims, 6 Drawing Sheets

(51) Int. Cl.
*H04W 36/00* (2009.01)
*H04W 36/18* (2009.01)

(56) References Cited

U.S. PATENT DOCUMENTS

| | | | | |
|---|---|---|---|---|
| 2013/0315075 A1* | 11/2013 | Tamura | ............... | H04L 43/0823 370/242 |
| 2015/0271713 A1* | 9/2015 | Kim | ............... | H04W 76/15 455/437 |
| 2015/0334624 A1 | 11/2015 | Kazmi et al. | | |
| 2016/0219604 A1* | 7/2016 | Fujishiro | ............... | H04W 36/04 |
| 2017/0048898 A1 | 2/2017 | Jung et al. | | |
| 2020/0045764 A1* | 2/2020 | Kim | ............... | H04W 36/305 |

FOREIGN PATENT DOCUMENTS

| | | |
|---|---|---|
| EP | 2934039 A1 | 10/2015 |
| WO | 2013/066060 A1 | 5/2013 |
| WO | 2018/077416 A1 | 5/2018 |

OTHER PUBLICATIONS

"Re-establishment Enhancements for HetNet", 3GPP TSG-RAN WG2 Meeting #83bis, R2-133555, Agenda : 7.1.3.2, NSN, Oct. 7-11, 2013, 7 pages.

"Analysis of RLF Recovery Mechanisms", 3GPP TSG RAN WG2 #83, R2-132779, Agenda : 7.2.1, Samsung, Aug. 19-23, 2013, pp. 1-7.

"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304, V14.2.0, Mar. 2017, pp. 1-49.

"Consideration on the System Information in NR", 3GPP TSG-RAN WG2 Meeting #94, R2-163743, Agenda : 9.4.3.2.3, ZTE, May 23-27, 2016, 4 pages.

"3rd Generation Partnership Project; Technical Specification Group Radio Access Network; Evolved Universal Terrestrial Radio Access Network (E-UTRAN); X2 application protocol (X2AP) (Release 14)", 3GPP TS 36.423, V14.2.0, Mar. 2017, pp. 1-242.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331, V14.2.2, Apr. 2017, pp. 1-721.

International Search Report and Written Opinion received for corresponding Patent Cooperation Treaty Application No. PCT/FI2017/050345, dated Aug. 24, 2017, 16 pages.

Extended European Search Report received for corresponding European Patent Application No. 17908505.5, dated Nov. 9, 2020, 9 pages.

* cited by examiner

MEASUREMENT CONFIGURATION

RELATED APPLICATION

This application was originally filed as Patent Cooperation Treaty Application No. PCT/FI2017/050345 filed on May 4, 2017.

FIELD

The present invention relates to measurement configuration, for example in the context of a wireless communication system.

BACKGROUND

Wireless communication may comprise establishment of radio links between mobiles, which may be referred to as user equipments, and base stations. In a traditional case, a mobile may roam in a coverage area of a cellular network, maintaining an attachment, and radio link, with the base station that is closest to the mobile. As the mobile moves, such that it leaves a coverage area of a cell controlled by a base station with which it has a radio link and enters another cell, of another base station, the mobile may undergo a handover procedure, to switch to the new cell. Handover decisions may be based, at least partly, on results of measurements performed by mobiles. Such measurements may be directed by the network.

In more advanced networks, a mobile may communicate simultaneously with more than one base station, which may be referred to a soft handover, for example. New radio links may be added to the communication session as suitable cells become available, and radio links may be removed from the communication session when the links become undesirable or untenable in a radio sense, for example, if distance between the mobile and the respective base station increases. Such decisions may be likewise based on measurements performed by the mobile. A soft handover provides diversity gain, as all the links are unlikely to be in a fade at the same time. A mobile may also operate under multi-connectivity where the mobile is connected with and, receives and/or transmits data to at least two access nodes, such as base stations, for example.

When a radio link is active, its quality may be monitored, to provide inputs to handover decisions and power control algorithms, for example. A radio link failure, RLF, is a situation where a radio link is determined to have become inoperative, for example due to continuity of the radio link failing at the physical layer. A RLF may occur, for example, in case interference near the mobile unexpectedly peaks. In practical terms, a determination that an RLF has occurred may be based on a signal level threshold, a signal-over-noise level threshold, a signal-to-interference-plus-noise ratio threshold, a block error rate threshold or a loss of synchronization, for example.

Recovery from a RLF may comprise, for example, searching for suitable cells, reading target cell system information and performing a random-access procedure with a suitable cell.

SUMMARY OF THE INVENTION

According to some aspects, there is provided the subject-matter of the independent claims. Some embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to receive, from a first cell, an indication of a measurement configuration valid for at least one neighbour cell of the first cell, and perform at least one measurement in accordance with the measurement configuration responsive to a radio link failure of a radio link over which the apparatus is communicating.

Various embodiments of the first aspect may comprise at least one feature from the following bulleted list:
- the measurement configuration is valid for a specific neighbour cell, the measurement configuration comprising an identity of the specific neighbour cell
- the measurement configuration comprises at least one measurement object for the specific neighbour cell
- the measurement configuration comprises at least one measurement object for a first carrier frequency
- the measurement configuration is valid for all neighbouring cells of the first cell
- the at least one memory and the computer program code are configured to, with the at least one processing core, cause the apparatus to start performing the at least one measurement before re-establishment of the radio link is complete, and to report results of the at least one measurement to a network after the radio link is re-established or during the re-establishment process
- the at least one memory and the computer program code are configured to, with the at least one processing core, cause the apparatus to re-establish the radio link with one of the at least one neighbour cell, and to report the results of the at least one measurement to an access node controlling the one of the at least one neighbour cell
- the at least one memory and the computer program code are configured to, with the at least one processing core, cause the apparatus further to participate in a communication session wherein a user plane is received over at least two radio links, the at least two radio links being selected at least partly based on the results
- the at least one memory and the computer program code are configured to, with the at least one processing core, cause the apparatus further to receive a plurality of measurement configurations from the first cell, to select a cell for radio link re-establishment, and to select from among the plurality of measurement configurations a measurement configuration valid for the selected cell, for performing the measurement
- the at least one memory and the computer program code are configured to, with the at least one processing core, cause the apparatus further to receive a plurality of measurement configurations from the first cell and to select a cell for radio link re-establishment, wherein the selection is based, at least partly, on which cells have a valid measurement configuration among the plurality of measurement configurations
- the at least one memory and the computer program code are configured to, with the at least one processing core, cause the apparatus to start performing the at least one measurement before selecting a cell for re-establishment
- the at least one memory and the computer program code are configured to, with the at least one processing core, cause the apparatus further to report at least one result of the at least one measurement with an indication that the at least one measurement was performed in accordance with a measurement configuration valid for any cell.

According to a second aspect of the present invention, there is provided a method comprising receiving, from a first cell, an indication of a measurement configuration valid for at least one neighbour cell of the first cell, and performing at least one measurement in accordance with the measurement configuration responsive to a radio link failure of a radio link over which an apparatus performing the method is communicating.

Various embodiments of the second aspect may comprise at least one feature from the following bulleted list:
- the measurement configuration is valid for a specific neighbour cell, the measurement configuration comprising an identity of the specific neighbour cell
- the measurement configuration comprises at least one measurement object for the specific neighbour cell
- the measurement configuration comprises at least one measurement object for a first carrier frequency
- the measurement configuration is valid for all neighbouring cells of the first cell
- performing the at least one measurement is started before re-establishment of the radio link is complete, and wherein results of the at least one measurement are reported to a network after the radio link is re-established or during the re-establishment process
- re-establishing the radio link with one of the at least one neighbour cell, and reporting the results of the at least one measurement to an access node controlling the one of the at least one neighbour cell
- participating in a communication session wherein a user plane is received over at least two radio links, the at least two radio links being selected at least partly based on the results
- receiving a plurality of measurement configurations from the first cell, selecting a cell for radio link re-establishment, and selecting from among the plurality of measurement configurations a measurement configuration valid for the selected cell, for performing the measurement
- receiving a plurality of measurement configurations from the first cell and selecting a cell for radio link re-establishment, wherein the selection is based, at least partly, on which cells have a valid measurement configuration among the plurality of measurement configurations
- starting performing the at least one measurement before selecting a cell for re-establishment
- reporting at least one result of the at least one measurement with an indication that the at least one measurement was performed in accordance with a measurement configuration valid for any cell.

According to a third aspect of the present invention, there is provided an apparatus comprising at least one processing core, at least one memory including computer program code, the at least one memory and the computer program code being configured to, with the at least one processing core, cause the apparatus at least to obtain a measurement configuration valid for at least one neighbour cell of a cell controlled by the apparatus, and indicate the measurement configuration to at least one user equipment.

Various embodiments of the third aspect may comprise at least one feature from the following bulleted list:
- the indication is configured to enable the at least one user equipment to perform at least one measurement in accordance with the measurement configuration responsive to a radio link failure of a radio link over which the user equipment is communicating
- the at least one memory and the computer program code are configured to, with the at least one processing core, cause the apparatus to obtain the measurement configuration by requesting it from an access node controlling the at least one neighbour cell.

According to a fourth aspect of the present invention, there is provided a method comprising obtaining a measurement configuration valid for at least one neighbour cell of a cell controlled by an apparatus, and indicating the measurement configuration to at least one user equipment.

Various embodiments of the third aspect may comprise at least one feature from the following bulleted list:
- the indication is configured to enable the at least one user equipment to perform at least one measurement in accordance with the measurement configuration responsive to a radio link failure of a radio link over which the user equipment is communicating
- the at least one memory and the computer program code are configured to, with the at least one processing core, cause the apparatus to obtain the measurement configuration by requesting it from an access node controlling the at least one neighbour cell.

According to a fifth aspect of the present invention, there is provided an apparatus comprising means for receiving, from a first cell, an indication of a measurement configuration valid for at least one neighbour cell of the first cell, and means for performing at least one measurement in accordance with the measurement configuration responsive to a radio link failure of a radio link over which the apparatus is communicating.

According to a sixth aspect of the present invention, there is provided an apparatus comprising means for obtaining a measurement configuration valid for at least one neighbour cell of a cell controlled by an apparatus, and means for indicating the measurement configuration to at least one user equipment.

According to a seventh aspect of the present invention, there is provided a non-transitory computer readable medium having stored thereon a set of computer readable instructions that, when executed by at least one processor, cause an apparatus to at least receive, from a first cell, an indication of a measurement configuration valid for at least one neighbour cell of the first cell, and perform at least one measurement in accordance with the measurement configuration responsive to a radio link failure of a radio link over which the apparatus is communicating.

According to an eighth aspect of the present invention, there is provided a non-transitory computer readable medium having stored thereon a set of computer readable instructions that, when executed by at least one processor, cause an apparatus to at least obtain a measurement configuration valid for at least one neighbour cell of a cell controlled by an apparatus, and indicate the measurement configuration to at least one user equipment.

According to a ninth aspect of the present invention, there is provided a computer program configured to cause a method in accordance with at least one of the second and fourth aspects to be performed.

EMBODIMENTS

To reduce a delay in re-establishing a radio link or communication session, a network may configure a mobile with measurement configurations before a radio link failure, RLF, occurs. The mobile may subsequently, responsive to determining that a RLF has occurred, initiate measurements in accordance with these measurement configurations in parallel with re-establishment procedures to recover the failed radio link and/or a communication session run, at least partly, over the failed radio link. Performing the measurements in parallel with the re-establishment procedure may reduce an overall delay in resuming a communication session affected by the RLF.

Figure 1:
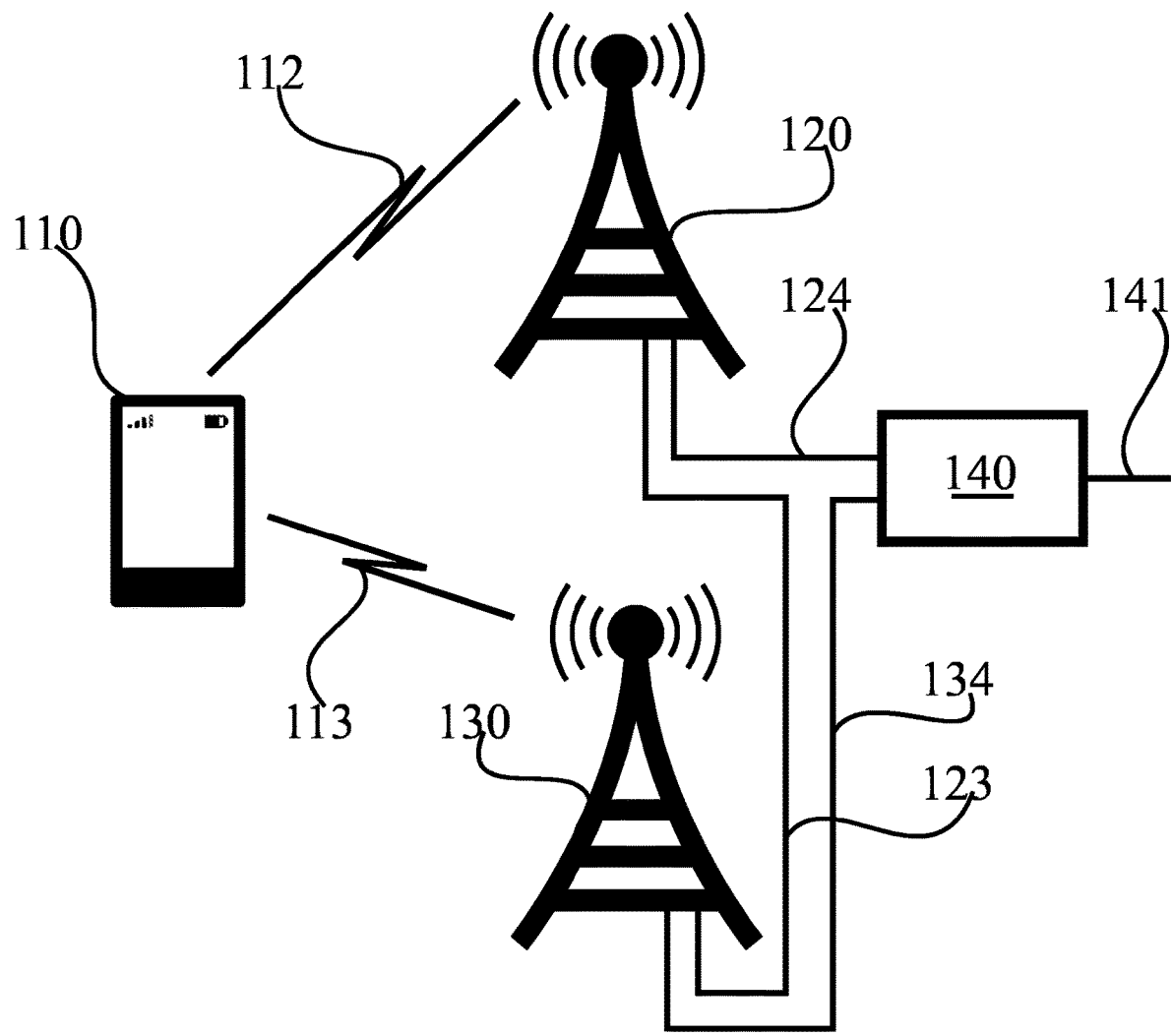
FIG. 1 illustrates an example system in accordance with at least some embodiments of the present invention.

FIG. 1 illustrates an example system in accordance with at least some embodiments of the present invention. Mobile 110, which may comprise, for example, a user equipment, mobile phone, smartphone, tablet device, laptop computer, desktop computer or another device configured to act as a user equipment of a cellular or non-cellular communication system, is in wireless communication with base station 120 and, optionally, also base station 130.

To achieve interoperability, mobile 110 and base stations 120 and/or 130 may be configured to operate in accordance with a same communication technology, such as, for example, a cellular or non-cellular technology. Examples of cellular communication technologies include wideband code division multiple access, WCDMA, long term evolution, LTE, and fifth generation, 5G, also known as new radio, NR. Examples of non-cellular communication technologies include wireless local area network, WLAN, and worldwide interoperability for microwave access, WiMAX, technologies. However, in some embodiments, the base stations may also operate under different radio access technologies, RATs, such as LTE and 5G.

Radio link 112 connects mobile 110 with base station 120, and optional radio link 113 connects mobile 110 with base station 130. While two radio links are illustrated in FIG. 1, the invention may be applicable also in situations where mobile 110 is engaged in a communication session which uses a single radio link, or one that uses more than two radio links. Radio links 112 and/or 113 may be arranged in accordance with a same communication technology as mobile 110 and base stations 120 and 130, to achieve interoperability. As said, base stations 120 and 130, as well as mobile 110, may be capable of communicating also with other communication technologies. The expression "base station" is a terminological choice by which it is not intended to limit the present disclosure to any specific technology. Depending on a communication technology used, the expression "access point" may be used alternatively to "base station". The expression "access node" may comprise either a base station or an access point.

Inter-base station link 123 enables the base stations to exchange information directly. For example, measurement configuration information may be communicated over inter-base station link 123. This link may be referred to as an X2 interface, for example, depending on the technology in use. Some technologies do not have an inter-base station link, and systems built according to such technologies may allow base stations to communicate with each other via a core network or via a base station controller device, for example.

Interface 124 connects base station 120 to network node 140. Interface 134 connects base station 130 with network node 140. Network node 140 may comprise, for example, a base station controller or a core network node, such as, for example, a mobility management entity, gateway or switch. Network node 140 may be interfaced with further nodes, which are not illustrated in FIG. 1, via interface 141. Inter-base station link 123, interface 124, interface 134 and/or interface 141 may comprise wire-line connections, for example. While base station 120 and base station 130 are in the example of FIG. 1 connected to the same network node 140, in general not all base stations need be connected to a same node. In the absence of inter-base station link 123, base station 120 and base station 130 may communicate via network node 140, or more generally via a core network, for example.

Radio links 112 and/or 113 may be comprised in an active communication session of mobile 110. Mobile 110 may receive information via either or both radio links on downlink parts of the links, and/or mobile 110 may transmit information on uplink parts of the link or links. To maintain a radio link, mobile 110 may participate in power control procedures for the radio link, and mobile 110 may be configured to monitor radio link quality of the radio link.

Where mobile 110 is engaged in a communication session which comprises more than one radio link, the session may comprise receiving user and control planes over more than one radio link comprised in the session. By receiving the control plane it may be meant that a signalling radio bearer, SRB, is received. The control plane may comprise a radio resource control, RRC, layer, for example carried in a SRB. The control plane may handle radio-specific functionality which depends on the state of mobile 110. Mobile 110 may be in an idle state or a connected state, for example. A data radio bearer, DRB, may be used in the user plane, distinct from the control plane. In at least some embodiments, a SRB or control plane is not used to communicate user data, such as, for example, data of a user application the user of the mobile 110 uses. Multi-connectivity may comprise the mobile communicating via at least two radio links, wherein the radio links may be provided by at least two different cells, wherein the at least two different cells may be controlled by a same access node or by at least two different co-operating access nodes. A multi-connectivity communication session may comprise transmitting and/or receiving a control plane over more than one radio link and/or transmitting and/or receiving user plane over more than one radio link.

Figure 2A:
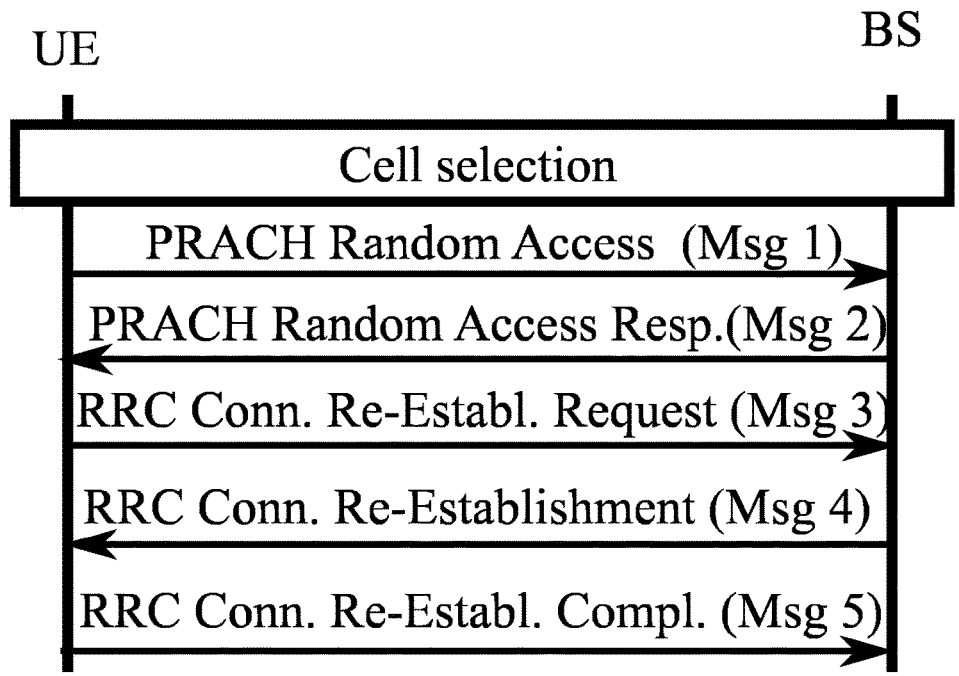
FIG. 2A illustrates a RRC connection re-establishment process in accordance with at least some embodiments of the invention.

A RRC connection re-establishment process may comprise, initially, a cell selection, after which the mobile transmits a RACH message, such as a PRACH Random Access message, to a base station controlling the selected cell. The base station responds with a RACH response, such as a PRACH Random Access Response, to the mobile. Subsequently, the mobile may transmit a RRC Connection Re-establishment request to the base station, which may respond with a RRC Connection Re-establishment message to the mobile, which completes the process with a RRC Connection Re-establishment Complete message to the base station. Such a process between a mobile user equipment, UE, and a base station, BS, is illustrated in FIG. 2A. Such a re-establishment process may take time, this time is denoted herein as $T_{UE\text{-}re\text{-}establish\_delay}$. An example of this delay is:

$$T_{UE\text{-}re\text{-}establish\_delay} = 50 \text{ ms} + N_{freq} * T_{search} + T_{SI} + T_{PRACH},$$

where $N_{freq}$ is the total number of carrier frequencies available for RRC re-establishment, $T_{search}$ is the time duration for searching a target cell, $T_{SI}$ is the time required to read the target cell System Information, SI, and $T_{PRACH}$ is the time for performing the random access process described above. Possible values are: $T_{UE\text{-}re\text{-}establish\_delay} = 360$ ms for $N_{freq} = 1$, $T_{search} = 100$ ms, $T_{SI} = 200$ ms, $T_{PRACH} = 10$ ms. If the target cell is not prepared, the mobile may revert to Idle mode and consequently need an additional 61 ms, for example, for initial connection setup. In this case, the (re)establishment delay could increase to 391 ms, for example.

After re-establishing to a target cell, the mobile may receive an RRC Re-configuration Message which configures the mobile to perform measurements following a measurement configuration. Measurements may be reported to the network upon an expiry of a measurement event, for example. The network may configure for the mobile additional radio links if it is multi-connectivity capable. Thus, a mobile that is multi-connectivity capable may need to wait for T before (re)establishing a multi-connectivity session:

$$T = T_{UE\text{-}re\text{-}establish\_delay} + T_{Reconfig} + T_{meas} + T_{report},$$

where $T_{Reconfig}$ is the time duration for sending, receiving and applying the RRC Connection Reconfiguration message comprising the measurement configuration, $T_{meas}$ is the time needed for the mobile to carry out the measurements and $T_{report}$ is the time for reporting them to the network.

To reduce the overall delay T, the system may be configured to enable the mobile to start performing measurements in an earlier phase of the overall re-establishment process. By earlier phase it may be meant, for example, before receipt in the mobile of a RRC Reconfiguration message from the selected cell.

A serving base station may indicate to mobile 110 at least one measurement configuration that is valid for a neighbouring cell of the serving cell. By indicating a measurement configuration it may be meant, for example, providing the measurement configuration or providing a pointer to or identity of a measurement configuration. The serving base station may obtain relevant measurement configuration information concerning its neighbouring cells in several ways. In case the base station also controls a neighbouring cell, it may directly be in possession of such information. Where the base station has an inter-base station link, such as an X2-interface, with a base station controlling the neighbouring cell, it may request the measurement configuration information over this interface. Alternatively, the base station may obtain the measurement configuration information via the core network or a base station controller, for example. The serving cell may indicate, when indicating the measurement configuration, that the indicated measurement configuration is to be performed in case RLF takes place.

In general, what is meant by the measurement configuration being valid for a certain cell is that the measurement configuration is usable in characterizing the environment of this certain cell, for example in terms of signal strengths of cells neighbouring this certain cell, and the resulting measurement report is configured to a form that is understandable to this cell. For example, results of measurements indicated in the measurement configuration are to be reported to this certain cell.

Once mobile 110 subsequently determines a RLF that concerns a radio link used by the mobile, the mobile may, autonomously, initiate at least one measurement based on a neighbor cell's measurement configuration received in the mobile before the RLF. A RLF may be determined based on expiry of a RLF timer, for example. By autonomously initiating it may be meant, for example, that mobile 110 initiates the measurement responsive to the RLF, rather than responsive to an instruction message from the network. Expressed in other words, the autonomous initiation may comprise that the RLF is an event that triggers, partly or completely, the measurement in mobile 110. For example, the mobile may select a cell for re-establishment, and then initiate a measurement in accordance with a measurement configuration received before the RLF that is valid for the selected cell. In some embodiments, the mobile may, when selecting the cell, take into account the received measurement configurations, such that the mobile preferentially selects a cell for which the mobile has a valid measurement configuration.

The autonomously initiated measurement may be started responsive to an expiry of an RLF timer, responsive to a configured time-offset indicating an out-of-synchronization state with the serving base station, responsive to an indication from a medium access control, MAC, layer of a random access problem or responsive to an indication from a radio link control, RLC, layer that a maximum number of retransmissions has been reached, for example.

Results of the measurement may be provided to the network in an early stage of the re-establishment procedure, for example appended to a RRC Connection Re-establishment request message or a RRC Connection Re-establishment complete message. In case the re-establishment fails and the mobile reverts to Idle mode before starting a new connection setup, the measurement results may be provided, at least partly, in a RRC Connection Request or RRC Connection Setup Complete message, for example. In case the measurement was conducted based on a default measurement configuration, valid for any cell, this may be indicated in connection with reporting the results. In an embodiment, "any cell" may comprise any neighboring cell to the cell that indicated the measurement configuration(s) to the UE, such as neighboring cells to the serving cell. Such an indication may comprise one bit in a measurement report, for example. Optionally, a new target cell may reconfigure the mobile after re-establishment/re-connection with a new measurement configuration replacing a default configuration, or a previously used measurement configuration.

An advantage of autonomously initiating the measurement(s) in mobile 110 after the RLF is that the time delays $T_{Reconfig}$, $T_{meas}$, $T_{report}$ do not have to run sequentially after the UE re-establishes to a new target and receives a new measurement configuration. Rather, these delays may run at least partly in parallel with the delay $T_{UE\text{-}re\text{-}establish\_delay}$, needed to re-establish the radio link. The re-establishment/establishment of the radio link may refer to re-establishing the previous radio link with the serving cell that has become useable again, or establishing a new radio link with the same or a new target cell, or (re-)establishing from the point of view of the UE a radio link to access the network, to mention only a few non-limiting example embodiments. The solution helps in (re)-establishing faster a multi-connectivity communication session for a mobile in case neighbor cell measurements are available to be reported immediately/or within short time after re-establishment/re-connection. The autonomously initiated measurement(s) may also save time in case of false RLF detection.

Fast recovery of a multi-connectivity communication session upon detection of RLF where the measurements are performed in parallel with the re-establishment procedure may be particularly useful where:

In case there are more than one radio link that the mobile can detect and use for multi-connectivity immediately or within a short time after RLF In case the mobile was using multi-connectivity prior the RLF detection and mistakenly declares a false RLF, that is, in case of false RLF detection. The re-establishment of multi-connectivity is performed faster, reducing the effects of the false RLF detection.

Further, an advantage of the described process may be obtained in that the re-establishment of a multi-connectivity communication session may be performed using radio resource management, RRM, measurements, also known as L3 measurements, that are performed according to the measurement configurations of the cell that the mobile re-establishes/reconnects to after RLF.

The measurement configurations indicated by the serving cell before RLF may be valid for specific cell(s), a frequency or frequencies. For example, where a measurement configuration is valid for a specific cell or cells, it may comprise an identity of this cell or cells. The identity may comprise a physical cell identity, PCI, for example. Further, the measurement configuration may comprise a specific measurement object for a specific cell, such that the measurement configuration comprises a combination of cell identity and measurement object identity associated with each other. For example, for a specific cell, the measurement configuration may instruct to measure cells, identified in the measurement configuration, that are nearby to the specific cell, to assist the specific cell, if selected for re-establishment, to assess which nearby cells could be useful for the mobile in a multi-radio link communication session. The measurement configurations of different cells may differ, for example, by the cells that are to be measured, the parameters that are used for measurement events and/or the L3 filter coefficient that shall be used for the measurements.

For example, a measurement configuration of a cell A, by which it is meant valid for cell A, may require that cells B, C, and D are to be measured for signal strength and/or quality, whereas a measurement configuration of cell B may require that cells A, C, E and F are to measured, for example. In case the UE then after RLF of a current serving cell A establishes a radio link to cell B, for example, and reports the measurement results to the access node of cell B, the access node may then quickly setup a multi-connectivity session to the UE as it is already aware of which other cell(s) from A, C, E and F provide sufficient signal quality to the UE. The access node of cell B may for example establish multi-connectivity to the UE from cells B and C, assuming the cell C also provides adequate signal quality to the UE for multi-connectivity purposes. The cell C may be controlled by the access node of cell B or by another access node, in which case the multi-connectivity establishment may require communication between access nodes of cells B and C over e.g. an X2 interface.

As another example, the measurement configuration may comprise an indication of a carrier frequency it is valid for. Mobile 110 may be configured to treat this measurement configuration as valid for any cell operating on the indicated carrier frequency, or on any one of plural indicated carrier frequencies. Further, the measurement configuration may comprise a specific measurement object for a specific carrier frequency, such that the measurement configuration comprises a combination of carrier frequency indication and measurement object identity associated with each other.

An advantage of using a measurement configuration valid for a carrier frequency, rather than a specific cell, is that measurement configurations need not be signalled separately for each cell, or group of cells.

Alternatively to the measurement configuration being valid for a specific cell or carrier frequency, the measurement configuration may be valid for all cells. Such a measurement configuration may be referred to as a default measurement configuration, for example, as mobile 110 may use it for any cell it selects for (re)establishment. A default measurement configuration need not comprise any cell identities as such, since it may be used with any cell. Rather, the mobile may report measurements of the strongest cells, for example. When using a default measurement configuration, mobile 110 may initiate a measurement based on it even before selecting a cell for re-establishment, since the default measurement configuration will be valid for any selected cell.

In a measurement configuration to be applied after RLF, the mobile may report results of measurements performed based on the measurement configuration in an early phase, for example, the earliest practicable phase. In this case, measurement events, triggering the reporting, may be omitted from the measurement configuration and the may UE report the available measurement results. For instance, the UE may be configured to report the K strongest cells having a received signal strength or quality above a certain threshold where K and the threshold are configurable. Alternatively, the measurement configuration may comprise reporting trigger criteria, such as measurement events which may relate to at least one of: time-to-trigger, offsets and hysteresis. The measurement event may expire before the UE re-establishes to the target cell or after. In the former case, the UE may report the results of measurements at the earliest practicable phase. A measurement configuration may comprise an indication of at least one measurement quantity, such as reference signal received power, RSRP, reference signal received quality, RSRQ, or another quality to be measured.

Measurement configuration information indicated from the serving cell before RLF may comprise both cell- or frequency-specific measurement configuration information and a default measurement configuration. The default configuration may then be used, in case a cell is selected for re-establishment for which there is no valid cell- or frequency-specific measurement configuration. An advantage of having both kinds of measurement configuration information lies in reduced signalling overhead, since some cells may be covered with the default measurement configuration, and for the rest a deviation may be indicated, for example, with respect to measurement configuration information of the default measurement configuration.

The measurement configuration provided by the serving cell may be valid for the serving cell itself, as well. For example, in case mobile 110 selects the former serving cell for re-establishment, or establishment, mobile 110 may initiate a measurement based on, for example, a measurement configuration received before the RLF which is valid for the carrier frequency used by the formerly serving cell. A measurement configuration valid for any cell would also be valid for the formerly serving cell. The serving cell may provide a specific measurement configuration to be applied in case of RLF, separately from a measurement configuration provided in connection with normal operation as serving cell.

The network may leverage information from robustness optimization statistics to optimize the signalling of the measurement configurations:

The measurement configurations may be provided only by the cells whose mobiles are relatively more likely to experience RLFs, that is, other cells which do not have a history of mobiles experiencing RLFs may omit the signalling of these measurement configurations.

From the robustness statistics, a serving cell can determine with respect to which neighbouring cell edge(s) RLFs tend to occur. Based on this information, the cell may provide the measurement configurations only for these neighbouring cells.

Using the mobility parameters optimized by the robustness statistics, the serving cell may configure the mobiles with an event-based trigger for providing the measurement configurations, which expires before any RLF occurs.

The default measurement configuration may be broadcasted as part of the serving cell's system information blocks, SIBs. For example, the SIB containing the cell selection parameters for mobiles in Idle state may indicate the measurement parameters to be used for identifying the neighbouring cells for fast re-establishment of multi-connectivity. Alternatively or in addition, the default measurement configuration may be configured to the mobile when the mobile attaches for the first time to the network.

The measurement parameters of neighbour-cell specific or default measurement may indicate the frequencies with higher or lower priority for measuring and reporting. A measured cell quantity may define the minimum condition for selecting the cell, and/or priority can be applied among cells meeting the reporting quantity.

Figure 2B:
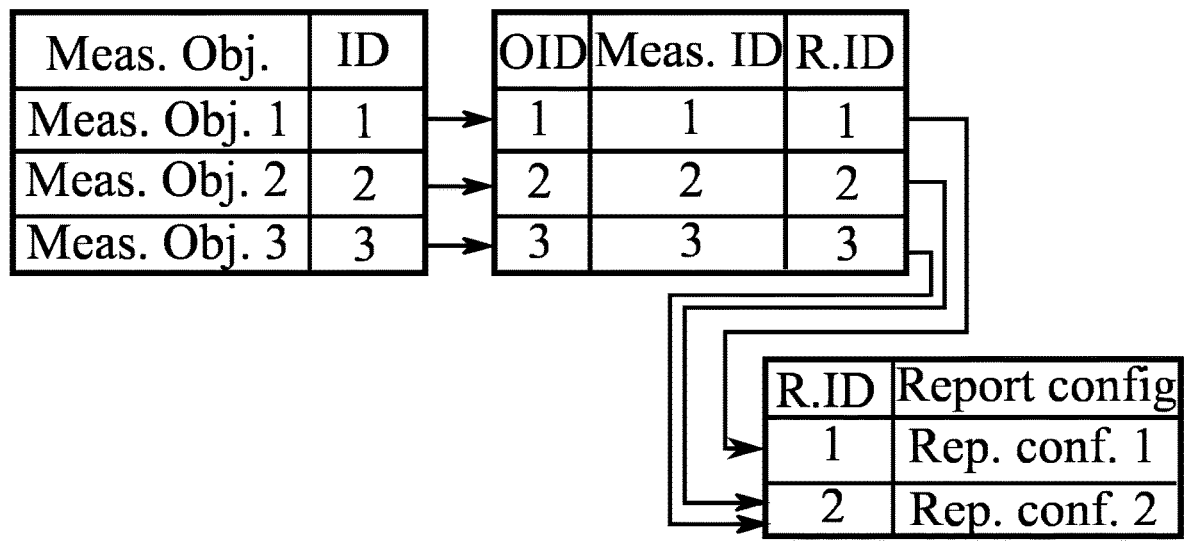
FIG. 2B illustrates an example measurement configuration data structure.

FIG. 2B illustrates an example measurement configuration data structure. On the left is a data substructure comprising measurement objects "Meas. Obj." and their identities, "ID". The identities are associated with measurement identities "Meas. ID" in the centre data substructure of FIG. 2B, which comprises the measurement object identities "OID" on the left, measurement identities "Meas. ID" in the centre and report identities "R.ID" on the right. The report identities are associated with reporting configurations in the right-most data substructure, which comprises the report identities "R.ID" on the left, and reporting configurations "Report Config" on the right. In the measurement configuration illustrated in FIG. 2B, measurements 2 and 3 are reported together in a report in accordance with report configuration 2.

Figure 3:
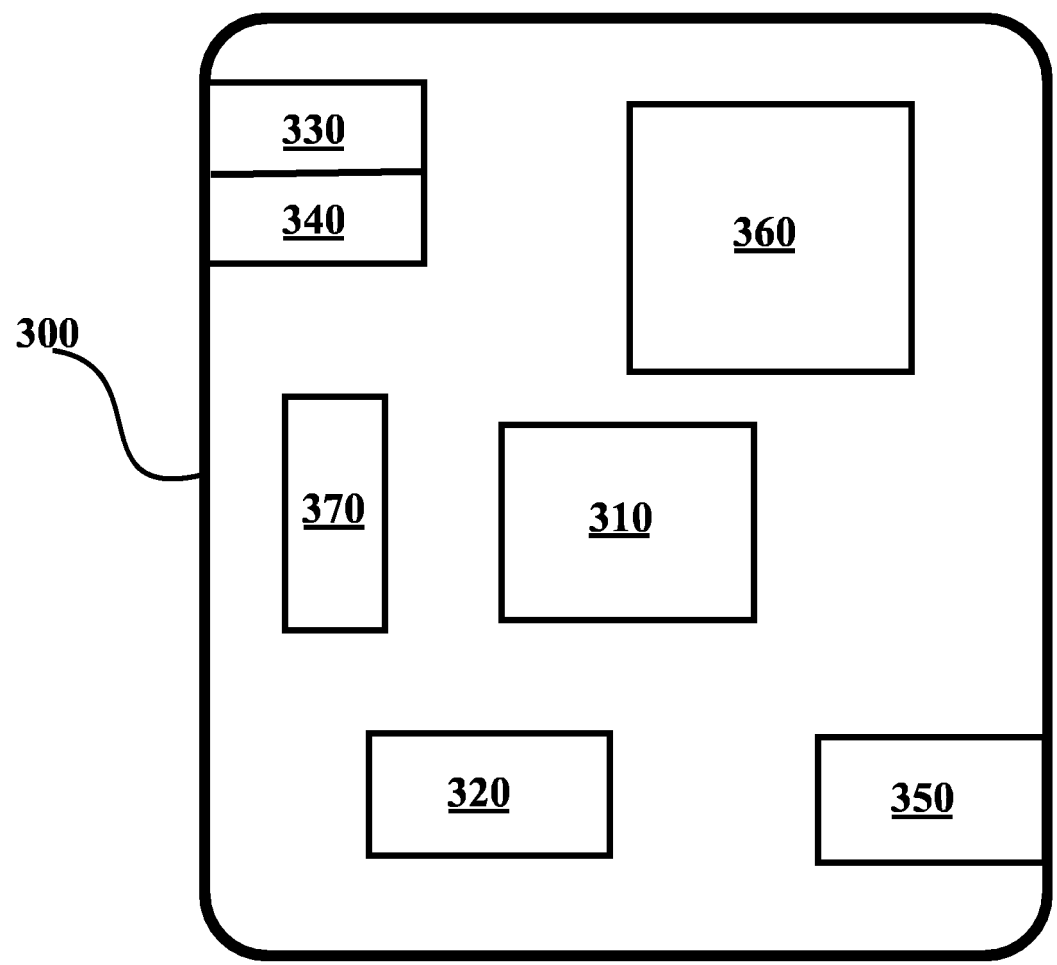
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as mobile 110 of FIG. 1. In applicable parts, device 300 may also comprise, or be comprised in, a base station, or in general an access node. The access node may be, for example, a node B, or evolved node B, or a gNB, as referred to in 5G. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to manage multi-connectivity communication sessions.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

In an embodiment at least some of the functionalities of the apparatus of FIG. 3 may be shared between two physically separate devices forming one operational entity. Therefore, the apparatus of FIG. 3 may be seen to depict the operational entity comprising one or more physically separate devices for executing at least some of the described processes. The apparatus utilizing such shared architecture, may comprise a remote control unit, RCU, such as a host computer or a server computer, operatively coupled, for example via a wireless or wired network, to a remote radio head, RRH, located in the base station. In an embodiment, at least some of the described processes may be performed by the RCU. In an embodiment, the execution of at least some of the described processes may be shared among the RRH and the RCU. In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Figure 4:
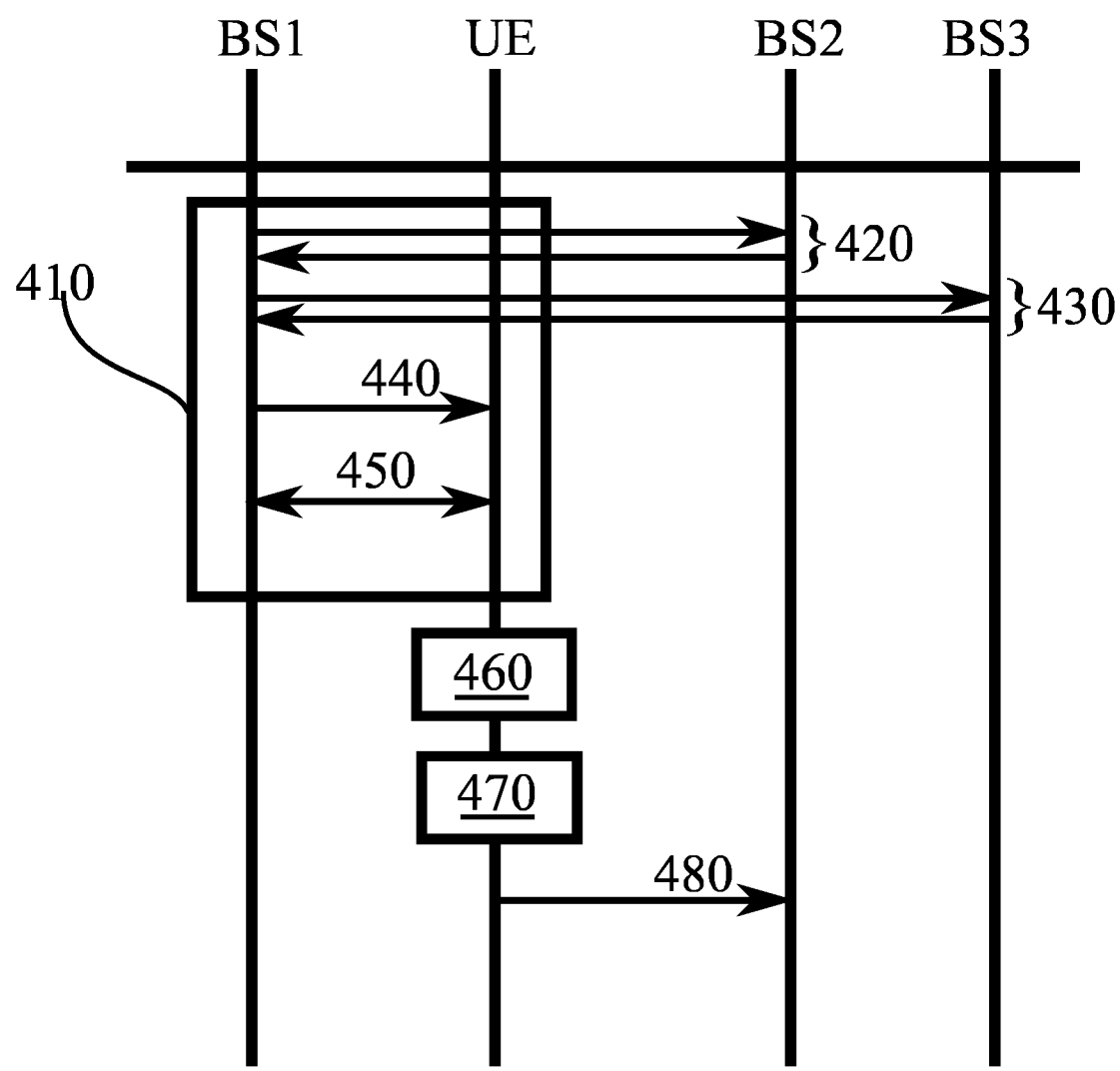
FIG. 4 illustrates signalling in accordance with at least some embodiments of the present invention.

FIG. 4 illustrates signalling in accordance with at least some embodiments of the present invention. On the vertical axes are disposed, on the left, first base station BS1, mobile UE, second base station BS2 and third base station BS3.

Initially, in phase 410, a radio link is present between first base station BS1 and mobile UE. Radio link 410 may be comprised in a multi-radio link communication session, such as, for example, a multi-connectivity communication session. First base station BS1 queries second base station BS2 and third base station BS3 for measurement configuration information of these base stations, for provision to mobile UE in case of radio link failure. The queries, and responses with the requested information, are illustrated in FIG. 4 as phases 420 and 430, respectively. The communication of phases 420 and 430 may take place via an inter-base station interface, and/or via a core network, for example. Although illustrated as taking place during presence of radio link 410, these queries may be performed by first base station BS1 also prior to the establishment of radio link 410.

In phase 440, first base station BS1 indicates to mobile UE at least one measurement configuration, for use in case radio link 410 fails. This measurement configuration(s) may be valid for cells neighbouring a serving cell of mobile UE, the serving cell being controlled by first base station BS1.

Phase 450 is a communication session of mobile UE via first base station BS1, which may comprise, for example, a web browsing or video streaming session.

In phase 460, mobile UE determines a radio link failure, RLF, of radio link 410. The determination may be based, as described above, on expiry of a RLF timer, for example. In phase 470, mobile UE selects a cell for re-establishment. In the illustrated example, a cell controlled by second base station BS2 is selected. Mobile UE further, in phase 470, initiates a measurement defined by a measurement configuration, received in phase 440, this measurement configuration being valid for the selected cell controlled by base station BS2. For example, the measurement configuration valid for the selected cell may instruct the mobile to measure cells controlled by first base station BS1 and third base station BS3.

In phase 480, mobile UE seeks re-establishment with the selected cell. In connection with the re-establishment, mobile UE may provide results of the measurement initiated in phase 470, for example, the results may be comprised in a RRC connection re-establishment request message transmitted from mobile UE to second base station BS2. Second base station BS2 may begin processing the results already during the re-establishment process, for example to add a further radio link, for example with third base station BS3 to resume a multi-radio link communication session for mobile UE.

Figure 5:
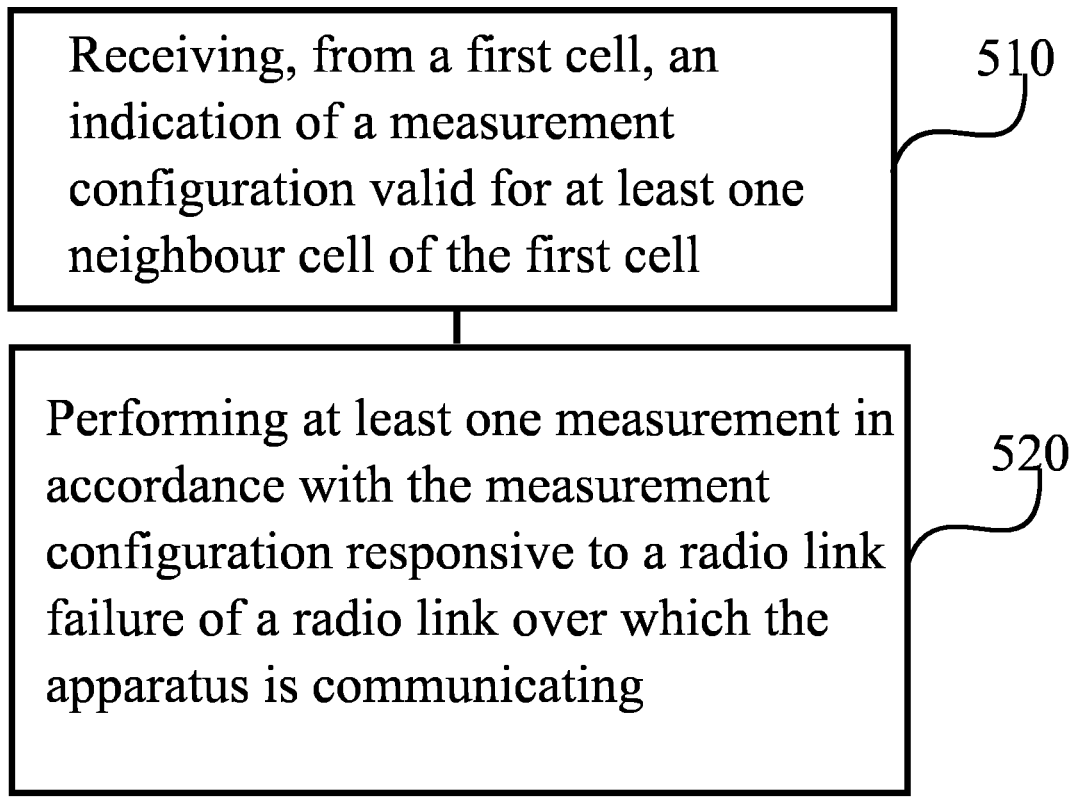
FIG. 5 is a flow graph of a method in accordance with at least some embodiments of the present invention.

FIG. 5 is a flow graph of a method in accordance with at least some embodiments of the present invention. The phases of the illustrated method may be performed in mobile 110, for example, or in a control device configured to control the functioning thereof, when installed therein.

Phase 510 comprises receiving, from a first cell, an indication of a measurement configuration valid for at least one neighbour cell of the first cell. The first cell may in an embodiment be the current serving cell. The receiving may comprise receiving e.g. a broadcast or a dedicated message from the first cell. Phase 520 comprises performing at least one measurement in accordance with the measurement configuration responsive to a radio link failure of a radio link over which the apparatus is communicating. The measurement of phase 520 may be autonomously performed, for example.

Figure 6:
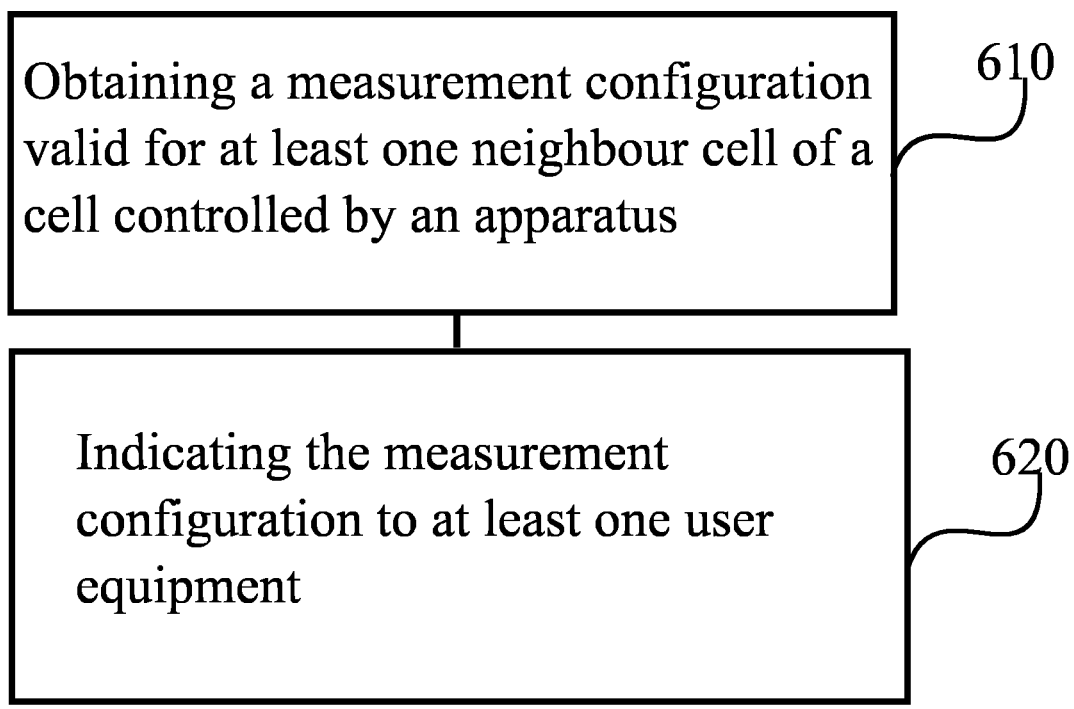
FIG. 6 is a flow graph of a method in accordance with at least some embodiments of the present invention.

FIG. 6 is a flow graph of a method in accordance with at least some embodiments of the present invention. The phases of the illustrated method may be performed in base station 120, for example, or in a control device configured to control the functioning thereof, when installed therein.

Phase 610 comprises obtaining a measurement configuration valid for at least one neighbour cell of a cell controlled by an apparatus. Phase 620 comprises indicating the measurement configuration to at least one user equipment. In an embodiment, the at least one user equipment is served by the apparatus. In another embodiment, the user equipment is/are not (at least not yet) served by the apparatus, but the apparatus may e.g. broadcast the measurement configuration to at least one user equipment during initial network access of the at least one user equipment.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in reducing delays in wireless communication systems.

ACRONYMS LIST 5G fifth generation
BS base station
DRB data radio bearer
LTE long term evolution
MAC medium access control
NFC near field communication
NR new radio
PDCCH physical downlink control channel
PRACH physical random access channel
RACH random access channel
RAT radio access technology
RCU remote control unit
RLF radio link failure
RLM radio link monitoring
RRC radio resource control
RRM radio resource management
RSRP reference signal received power
RSRQ reference signal received quality
SINR signal to interference plus noise ratio
SRB signalling radio bearer
UE user equipment
WCDMA wideband code division multiple access
WiMAX worldwide interoperability for microwave access
WLAN wireless local area network

REFERENCE SIGNS LIST

| | |
|---|---|
| 110 | Mobile |
| 120, 130 | Base station |
| 140 | Network node |
| 112, 113 | Radio link |
| 123 | Inter-base station interface |
| 300-370 | Structure of the device of FIG. 3 |
| 410-480 | Signalling phases of the process of FIG. 4 |
| 510-520 | Phases of the method of FIG. 5 |
| 610-620 | Phases of the method of FIG. 6 |

The invention claimed is:

1. An apparatus comprising at least one processing core, at least one memory including computer program code, the at least one memory and the computer program code being configured to, with the at least one processing core, cause the apparatus at least to:

receive, from a first cell, a plurality of measurement configurations, including receiving a cell-specific measurement configuration that is valid specifically for a second cell, wherein the cell-specific measurement configuration that is valid for the second cell is to be used by the apparatus when the second cell is selected for link-re-establishment;

wherein the cell-specific measurement configuration that is valid for the second cell includes an identity of the second cell and indicates a plurality of measurement parameters specific to the second cell including a set of cells neighboring the second cell to be measured and at least one measurement quantity to be measured by the apparatus for the set of cells indicated by the cell-specific measurement configuration, and an instruction to report measurement results to the second cell in a form that is understandable to the second cell to assist the second cell in establishing a multi-connectivity communication session for the apparatus after a radio link failure for the apparatus;

wherein each measurement configuration originates from an access node that controls the cell for which the measurement configuration is valid, and wherein the cell-specific measurement configuration valid for the second cell originates from an access node controlling the second cell;

select, from among a plurality of cells, the second cell for radio link re-establishment for the apparatus, wherein selection of the second cell is based at least in part on the apparatus having received the cell-specific measurement configuration valid for the second cell;

perform at least one measurement in accordance with the cell-specific measurement configuration valid for the second cell and responsive to a radio link failure of a radio link over which the apparatus is communicating with the first cell; and report the measurement results of the at least one measurement to the access node controlling the second cell.

2. The apparatus according to claim 1, wherein the cell-specific measurement configuration comprises at least one measurement object for a first carrier frequency.

3. The apparatus according to claim 1, wherein the at least one memory and the computer program code are configured to, with the at least one processing core, cause the apparatus to start performing the at least one measurement before re-establishment of the radio link is complete, and to report results of the at least one measurement to a network after the radio link is reestablished or during the re-establishment process.

4. The apparatus according to claim 1, wherein the at least one memory and the computer program code are configured to, with the at least one processing core, cause the apparatus to re-establish the radio link with the second cell, and to report the results of the at least one measurement to the access node controlling the second cell.

5. The apparatus according to claim 1, wherein the at least one memory and the computer program code are configured to, with the at least one processing core, cause the apparatus further to participate, after reporting the results of the at least one measurement, in a communication session wherein a user plane is received over at least two radio links, the at least two radio links comprising a first radio link to the second cell and a second radio link to another cell than the first or the second cell, the second radio link being selected at least partly based on the results.

6. The apparatus according to claim 1, wherein the at least one memory and the computer program code are configured to, with the at least one processing core, cause the apparatus to start performing the at least one measurement before selecting a cell for re-establishment.

7. The apparatus of claim 1, wherein the cell-specific measurement configuration that is valid for the second cell includes a set of cells neighboring the second cell to be measured including at least one cell that is a neighbor of the second cell that is not a neighbor of the first cell.

8. A method comprising:

receiving, from a first cell, a plurality of measurement configurations, including receiving a cell-specific measurement configuration that is valid specifically for a second cell, wherein the cell-specific measurement configuration that is valid for the second cell is to be used by an apparatus when the second cell is selected for link-re-establishment;

wherein the cell-specific measurement configuration that is valid for the second cell includes an identity of the second cell and indicates a plurality of measurement parameters specific to the second cell including a set of cells neighboring the second cell to be measured and at least one measurement quantity to be measured by the apparatus for the set of cells indicated by an cell-specific measurement configuration, and an instruction to report measurement results to the second cell in a form that is understandable to the second cell to assist the second cell in establishing a multi-connectivity communication session for the apparatus after a radio link failure for the apparatus;

wherein each measurement configuration originates from an access node that controls the cell for which the measurement configuration is valid, and wherein the cell-specific measurement configuration valid for the second cell originates from an access node controlling the second cell;

selecting, from among a plurality of cells, the second cell for radio link re-establishment for the apparatus, wherein selection of the second cell is based at least in part on the apparatus having received the cell-specific measurement configuration valid for the second cell;

performing at least one measurement in accordance with the cell-specific measurement configuration valid for the second cell and responsive to a radio link failure of a radio link over which an apparatus performing the method is communicating with the first cell; and reporting the measurement results of the at least one measurement to the access node controlling the second cell.

9. The method according to claim 8, wherein performing the at least one measurement is started before re-establishment of the radio link is complete, and wherein results of the at least one measurement are reported to a network after the radio link is re-established or during the re-establishment process.

10. The method according to claim 8, further comprising participating, after reporting the results of the at least one measurement, in a communication session wherein a user plane is received over at least two radio links, the at least two radio links comprising a first radio link to the second cell and a second radio link to another cell than the first or the second cell, the second radio link being selected at least partly based on the results.

11. The method of claim 8, further comprising:
re-establishing the radio link with the second cell; and
reporting the results of the at least one measurement to the access node controlling the second cell.

12. The method of claim 8, comprising:
receiving a plurality of cell-specific measurement configurations from the first cell including the cell-specific measurement configuration valid for the second cell, each measurement configuration being valid for a different cell neighboring the first cell, selecting the second cell for radio link re-establishment among a plurality of cells neighboring the first cell, and selecting from among the plurality of measurement configurations a measurement configuration valid for the second cell, for performing the at least one measurement.

13. An apparatus comprising at least one processing core, at least one memory including computer program code, the at least one memory and the computer program code being configured to, with the at least one processing core, cause the apparatus at least to:

obtain a cell-specific measurement configuration that is valid specifically for a second cell, the second cell being a neighboring cell of a cell controlled by the apparatus, wherein the cell-specific measurement configuration originates from an access node controlling the second cell, and wherein the measurement configuration valid for the second cell includes an identity of the second cell and indicates a plurality of measurement parameters specific to the second cell including a set of cells neighboring the second cell to be measured and at least one measurement quantity to be measured for the set of cells indicated by the cell-specific measurement configuration, and an instruction to report measurement results to the second cell in a form that is understandable to the second cell to assist the second cell in establishing a multi-connectivity communication session for at least one user equipment after a radio link failure for the at least one user equipment; and indicate the measurement configuration to the at least one user equipment.

14. The apparatus according to claim 13, wherein the indication is configured to enable the at least one user equipment to perform at least one measurement in accordance with the measurement configuration responsive to a radio link failure of a radio link over which the at least one user equipment is communicating with the cell controlled by the apparatus.

15. The apparatus according to claim 13, wherein the at least one memory and the computer program code are configured to, with the at least one processing core, cause the apparatus to obtain the measurement configuration by requesting it from the access node controlling the second cell.

* * * * *